(12) United States Patent
Ichikawa et al.

(10) Patent No.: US 12,331,568 B2
(45) Date of Patent: Jun. 17, 2025

(54) VEHICLE DOOR HANDLE

(71) Applicant: ALPHA CORPORATION, Kanagawa (JP)

(72) Inventors: Shinji Ichikawa, Yokohama (JP); Kosuke Kakita, Yokohama (JP)

(73) Assignee: ALPHA CORPORATION, Kanagawa (JP)

( * ) Notice: Subject to any disclaimer, the term of this patent is extended or adjusted under 35 U.S.C. 154(b) by 807 days.

(21) Appl. No.: 17/168,375

(22) Filed: Feb. 5, 2021

(65) Prior Publication Data

US 2021/0156180 A1    May 27, 2021

Related U.S. Application Data

(63) Continuation of application No. PCT/JP2019/031504, filed on Aug. 8, 2019.

(30) Foreign Application Priority Data

Aug. 8, 2018    (JP) ................................ 2018-149429

(51) Int. Cl.
*E05B 79/06*    (2014.01)
*B60R 16/02*    (2006.01)
(Continued)

(52) U.S. Cl.
CPC .......... *E05B 85/16* (2013.01); *B60R 16/0215* (2013.01)

(58) Field of Classification Search
CPC .......... E05B 85/10; E05B 85/16; E05B 81/64; E05B 81/76; E05B 81/77; E05B 81/78;
(Continued)

(56) References Cited

U.S. PATENT DOCUMENTS 5,220,712 A * 6/1993 Taki .................... H02G 3/10
                                                    24/704.1
5,348,356 A * 9/1994 Moulton .............. E05B 37/20
                                                    292/87
(Continued)

FOREIGN PATENT DOCUMENTS

DE    102006055100 A1 *  5/2008  ............. E05B 81/76
DE    102018105550 A1 *  9/2019
(Continued)

OTHER PUBLICATIONS

International Search Report issued in PCT/JP2019/031504; mailed Oct. 8, 2019.
(Continued)

*Primary Examiner* — Carlos Lugo
(74) *Attorney, Agent, or Firm* — Studebaker Brackett PLLC (57) ABSTRACT

A vehicle door handle includes a pair of front and back covers which are connected to each other. One of the front and back covers includes a locking body. The locking body includes a leg portion configured to elastically deform and a locking hook projecting from a tip end of the leg portion. The locking hook is elastically locked and connected to a locked portion formed on the other of the front and back covers. The locking body is biased and the locking hook is press-contacted to the locked portion in a locking state of the locking body and the locked portion.

6 Claims, 7 Drawing Sheets

(51) Int. Cl.
*E05B 85/16* (2014.01)
*E05B 85/10* (2014.01)

(58) Field of Classification Search
CPC ............ Y10T 292/57; Y10T 292/0894; Y10T 292/0895; Y10T 292/0902; Y10T 292/0907
See application file for complete search history.

(56) References Cited

U.S. PATENT DOCUMENTS

| | | | | |
|---|---|---|---|---|
| 7,029,054 | B2* | 4/2006 | Kobayashi | E05B 79/06 296/146.1 |
| 7,140,653 | B2* | 11/2006 | Kobayashi | E05B 85/16 292/336.3 |
| 7,597,364 | B2* | 10/2009 | Muneta | B60R 25/246 292/336.3 |
| 7,681,755 | B2* | 3/2010 | Roesler | B65D 43/021 292/303 |
| 8,042,845 | B2* | 10/2011 | Tanimoto | E05B 81/78 292/336.3 |
| 8,636,309 | B2* | 1/2014 | Muller | E05B 81/78 292/336.3 |
| 9,193,309 | B2* | 11/2015 | Toyama | E05B 85/10 |
| 9,556,655 | B2* | 1/2017 | Shimizu | E05B 81/76 |
| 10,151,124 | B2* | 12/2018 | Faitl | E05B 81/20 |
| 10,196,838 | B2* | 2/2019 | Nagaoka | E05B 85/02 |
| 2005/0006909 | A1 | 1/2005 | Tanimoto et al. | |
| 2014/0125072 | A1* | 5/2014 | Nagata | E05B 1/00 292/336.3 |
| 2017/0002589 | A1* | 1/2017 | Toyama | E05B 17/18 |
| 2018/0051497 | A1 | 2/2018 | Wilke | |
| 2020/0173207 | A1* | 6/2020 | Shimizu | E05B 63/244 |

FOREIGN PATENT DOCUMENTS

| | | | | |
|---|---|---|---|---|
| EP | 1586726 | A1 * | 10/2005 | ............ E05B 77/02 |
| EP | 2642049 | A2 * | 9/2013 | ........... E05B 1/0061 |
| EP | 3078794 | A1 | 10/2016 | |
| JP | 2004-324106 | A | 11/2004 | |
| JP | 2010-242442 | A | 10/2010 | |
| JP | 2016-199921 | A | 12/2016 | |
| JP | 2018-112026 | A | 7/2018 | |
| WO | WO-2014190965 | A2 * | 12/2014 | ............ E05B 79/08 |

OTHER PUBLICATIONS

The extended European search report issued by the European Patent Office on Apr. 5, 2022, which corresponds to European Patent Application No. 19847932.1-1005 and is related to U.S. Appl. No. 17/168,375.

* cited by examiner

VEHICLE DOOR HANDLE

CROSS REFERENCE TO RELATED APPLICATIONS

This application is a continuation of International Application No. PCT/JP2019/031504, which is filed on Aug. 8, 2019 and claims priority to Japanese Patent Application No. 2018-149429 filed on Aug. 8, 2018, the entire contents of which are incorporated herein by reference.

BACKGROUND OF THE INVENTION

Field of the Invention

The present invention relates to a vehicle door handle.

Description of Related Art

As a door handle formed by connecting front and back covers, a door handle disclosed in Patent Literature 1 (JP-A-2016-199921) is known.

In the related art, after the front and back covers for the door handle are preliminarily connected to each other by using an engagement claw portion, a tip end of a through portion penetrating a through hole is melted in order to prevent rattling due to engagement.

[Patent Literature 1] JP-A-2016-199921

In the related art described above, since a melting operation of the through portion is required, manufacturing efficiency is reduced.

According to the embodiment, it is possible to implement a vehicle door handle with less rattling after connection and high manufacturing efficiency.

SUMMARY

One or more embodiments provide a vehicle door handle formed by connecting front and back covers 1, 2. One of the front and back covers 1, 2 includes a locking body. The locking body includes a leg portion 3 configured to elastically deform and a locking hook 4 projecting from a tip end of the leg portion. The locking hook 4 is elastically locked and connected to a locked portion 6 formed on the other of the front and back covers. The locking body 5 is biased and the locking hook 4 is press-contacted to the locked portion 6 in a locking state of the locking body 5 and the locked portion 6.

BRIEF DESCRIPTION OF THE DRAWINGS

FIGS. 1A and 1B are diagrams.

FIGS. 2A and 2B are cross-sectional views of a door handle.

FIGS. 4A and 4B are diagrams showing a back cover.

DESCRIPTION OF EMBODIMENTS

Figure 1A:
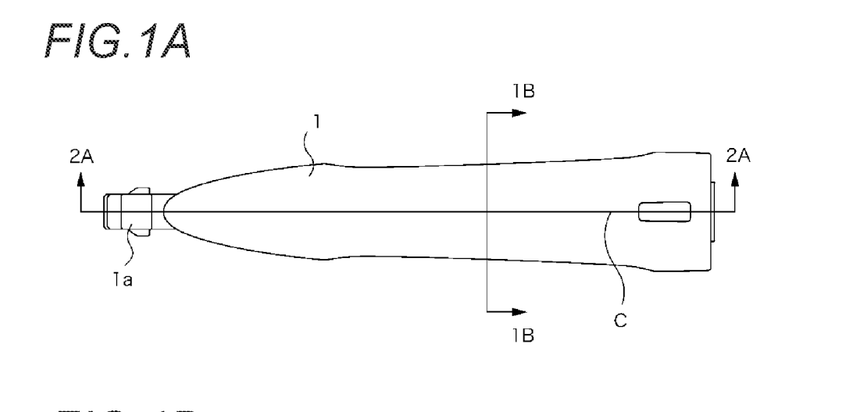
FIG. 1A is a front view.

A vehicle door handle is connected to a door in a posture in which a left side in FIG. 1A faces a front of a vehicle by using a handle attachment component (not shown) (in this specification, "front and rear" and "front and back" are defined based on an attachment posture to the vehicle). The door maintains a closed state by locking a door latch device (not shown) to a vehicle body, and in a connected state, the door handle is horizontally rotated around a rotation center to release locking of the door latch device.

In addition, an electrical component 9 is attached inside the door handle. In this example, as the electrical component 9, an antenna 9A used for communication with a portable transmission device carried by a user and a switch 9B to be press-contacted when the door latch device is moved to a locked state are accommodated, and a harness 10 to be described later is pulled out to the outside of the door handle.

Figure 1B:
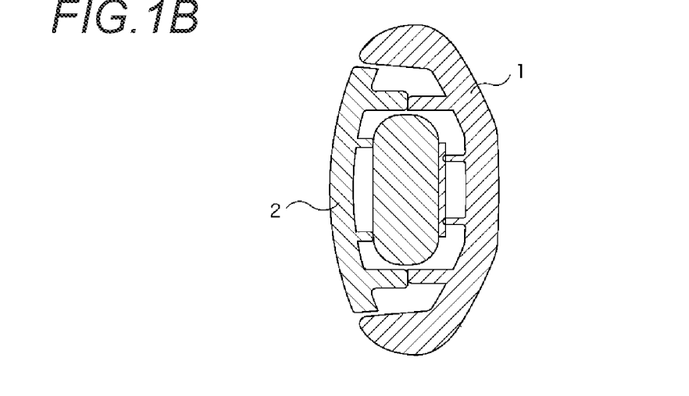
FIG. 1B is a cross-sectional view taken along a line 1B-1B of FIG. 1A.

As shown in FIG. 1B, the door handle has a C-shaped cross section, and is formed by connecting a front cover 1 that provides an outer surface shape in a front view in a state of being attached to the door and a back cover 2 that provides a hand hooking portion at the time of operation. The back cover 2 is formed in a shape capable of closing an open portion of a back surface of the front cover 1.

Figure 3:
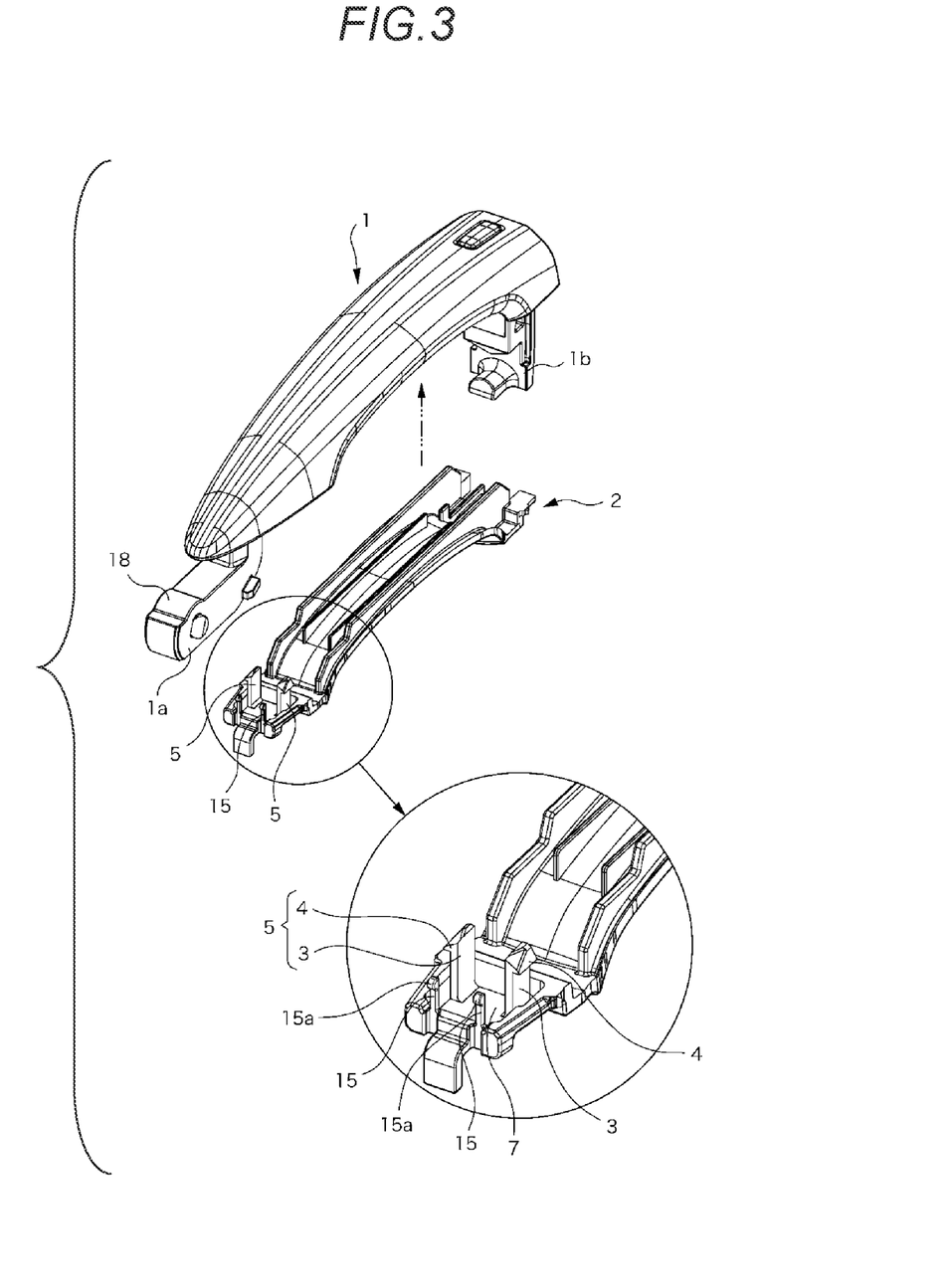
FIG. 3 is an exploded perspective view of the door handle.
Figure 4A:
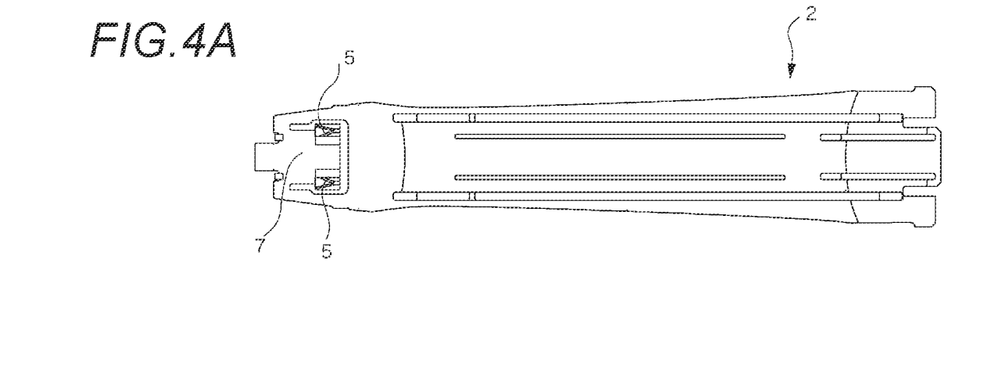
FIG. 4A is a plan view.
Figure 4B:
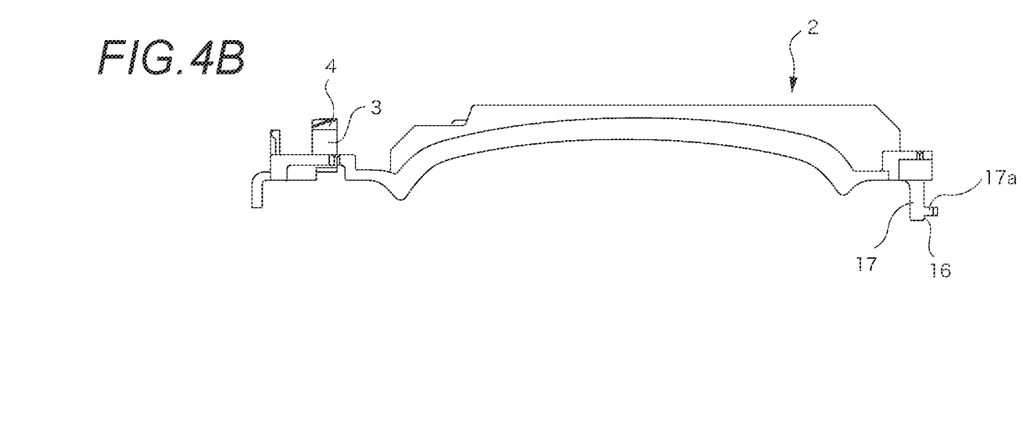
FIG. 4B is a side view.

The back cover 2 is made of a synthetic resin material, and, as shown in FIGS. 3 to 4B, a pair of locking bodies 5 are provided at symmetrical positions with respect to a longitudinal center line (C) at a front end portion. The locking bodies 5 are formed by projecting locking hooks 4 in a facing direction from tip ends of leg portions 3 which are elastically deformable by elasticity of a material of the back cover 2.

As shown in FIGS. 2A and 2B, and FIGS. 4A and 4B, the locking body 5 is formed in a cantilever shape having one end edge as a fixed end, and is formed on an elastically deformable support base 7. A back surface of the support base 7 is a pressing portion 8 for elastically deforming and pushing the entire support base 7 toward a front surface side.

Further, a pair of elastic pieces 15 are provided at symmetrical positions with respect to a longitudinal center at a tip end portion of the back cover 2. A tip end of the elastic piece 15 is erected toward the front surface side, and a press-contact projection 15a bulges forward toward the tip end.

In addition, a projecting piece 17 is extended from a rear end edge portion of the back cover 2 to a back surface side, and an insertion projecting piece 17a is projected rearward from a tip end portion thereof, and a slide stopper 16 is formed at a lower end of the projecting piece 17.

Figure 2A:
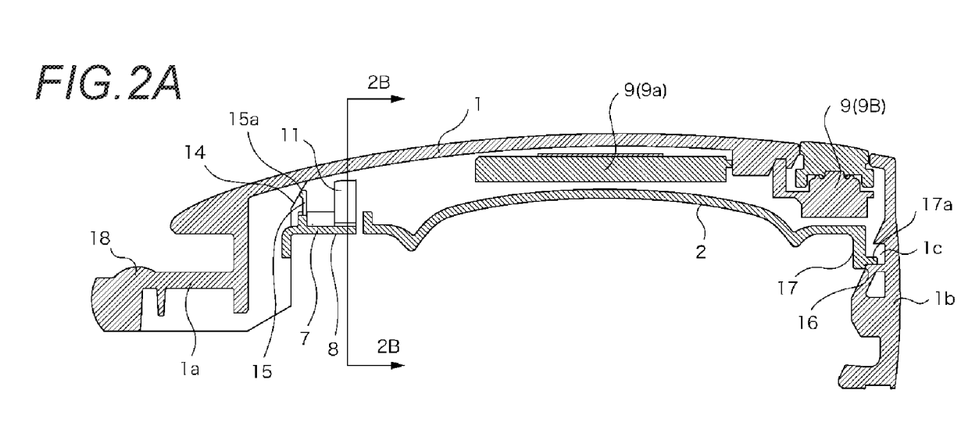
FIG. 2A is a cross-sectional view taken along a line 2A-2A of FIG. 1A.
Figure 2B:
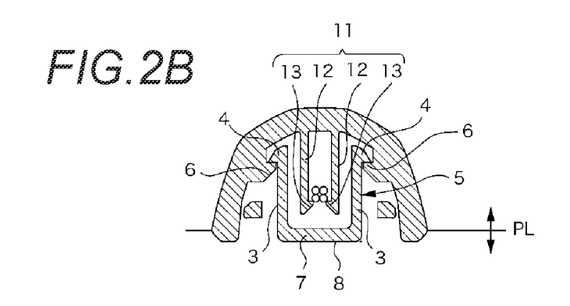
FIG. 2B is a cross-sectional view taken along a line 2B-2B of FIG. 2A.

In contrast, as shown in FIGS. 2A and 2B, the front cover 1 includes a hinge projecting piece 1a at the front end portion and an operating leg portion 1b at a rear end portion. A recess 1c into which the insertion projecting piece 17a of the back cover 2 can be inserted is formed in the operating leg portion 1b. The slide stopper 16 of the back cover 2 is formed so that the slide stopper 16 can come into contact with a front end surface of the recess 1c.

The hinge projecting piece 1a provides a rotation center while being mounted on the door by sliding an arc portion 18 that bulges toward the front surface side to an attachment component. The operating leg portion 1b operates the door latch device by operating an operation component (not shown) such as a lever provided on the attachment component when rotation is performed around the rotation center.

Figure 5:
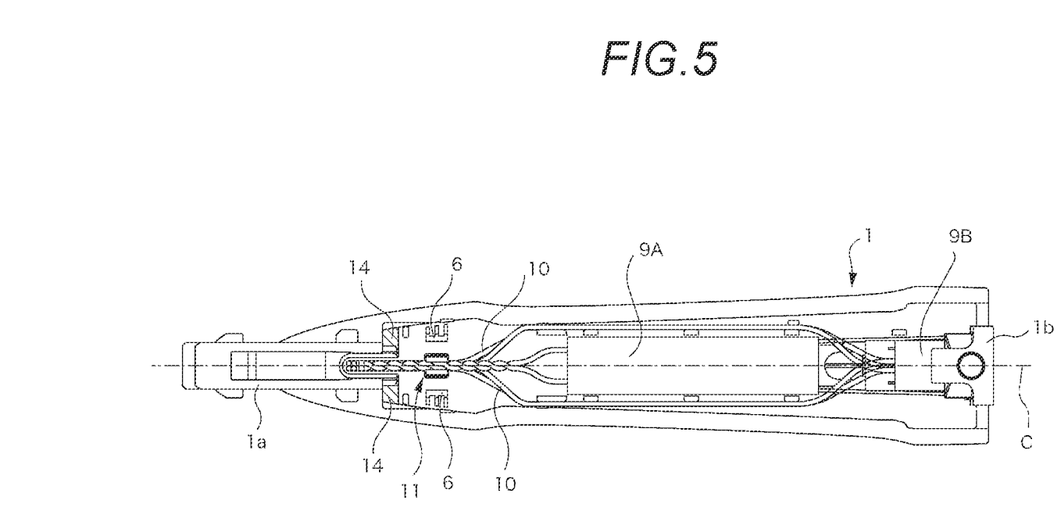
FIG. 5 is a rear view showing a front cover.
Figure 6:
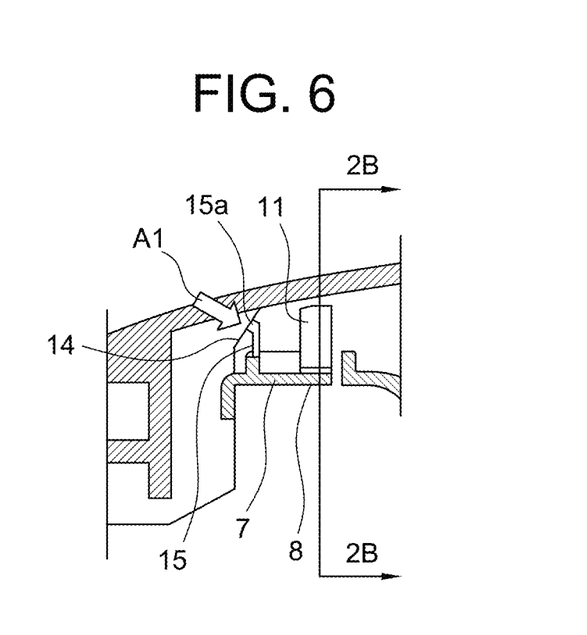
FIG. 6 is an enlarged partial version of FIG. 2A.

In addition, at the front end portion of the front cover 1, as shown in FIG. 2A and FIG. 6, an inclined surface 14 that gradually moves toward the front surface side as going rearward is formed in a hatched area in FIG. 5. The inclined surface 14 is disposed at a position where the press-contact projection 15a of the back cover 2 can come into contact with the inclined surface 14.

As described above, the antenna 9A and the switch 9B are fixed to the front cover 1, and as shown in FIG. 5, the harness 10 pulled out from the antenna 9A and the switch 9B is pulled out to the outside of the door handle after a variation is prevented by a harness holding portion 11 formed at the front end portion.

As shown in FIG. 2B, the harness holding portion 11 is formed by projecting stopper projections 13 at tip ends of a pair of rising pieces 12 erected from a back surface wall of the front cover 1. The rising pieces 12 are disposed side by side in a width direction (a direction orthogonal to a longitudinal direction of the door handle, in this example, at symmetrical positions with respect to the longitudinal center line (C) of the door handle) as shown in FIG. 5, and the stopper projections 13 are disposed so that projecting ends face each other.

An appropriate interval is provided between the rising pieces 12. When the harness 10 is pushed into between the rising pieces 12 from a gap between the stopper projections 13 as shown in FIG. 2B, the rising pieces 12 are elastically deformed once to receive the harness 10, then elastically returns, and thereafter, the harness 10 is prevented from coming off.

Further, the front cover 1 is provided with locked portions 6 to which the locking hook 4 of the locking body 5 provided on the back cover 2 can be locked. As shown in FIG. 2B, the locked portions 6 are formed as an inward projection so as to be lockable with the locking hook 4 protruding outward, and are disposed side by side in the width direction as shown in FIG. 5.

Figure 9:
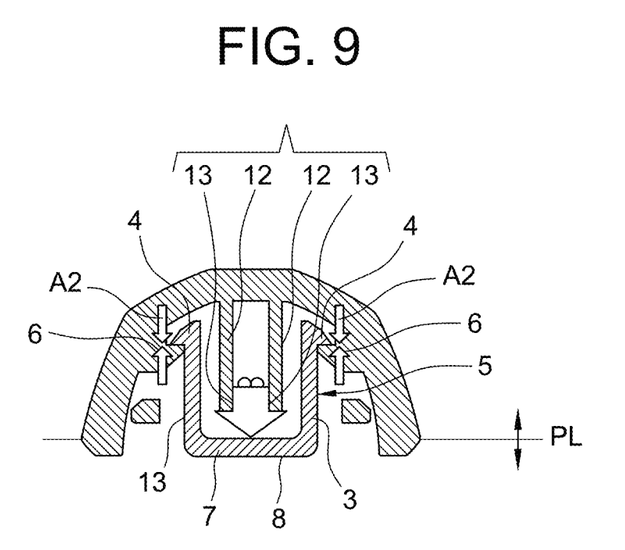
FIG. 9 is a cross-sectional view taken along a line 2B-2B of FIG. 2A showing a press contact direction of the support base.

As shown in FIG. 2B and FIG. 9, the locked portion 6 is undercut similarly as the stopper projection 13 of the harness holding portion 11 with respect to a parting surface (PL) of a molding die for manufacturing the front cover 1. In forming these undercut portions, it is necessary to incorporate a slide mold that moves in a direction orthogonal to a paper surface of FIG. 2B into the molding die.

In this example, as shown in FIG. 5, by arranging the harness holding portion 11 and the locked portion 6, which are factors for forming an undercut, in the width direction so that the positions thereof on the longitudinal center line (C) of the door handle match, both of the harness holding portion 11 and the locked portion 6 can be molded by one slide mold, and thus a structure of the molding die can be simplified.

Figure 7:
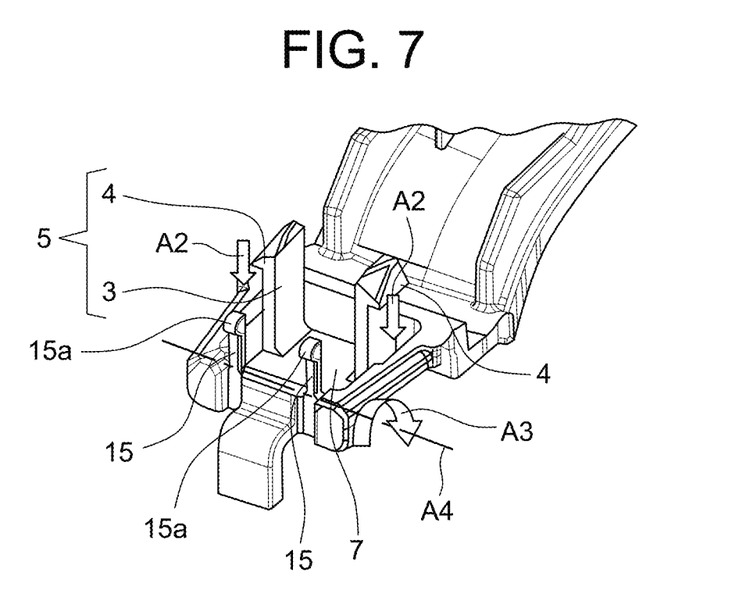
FIG. 7 is an enlarged partial version of FIG. 3.
Figure 8:
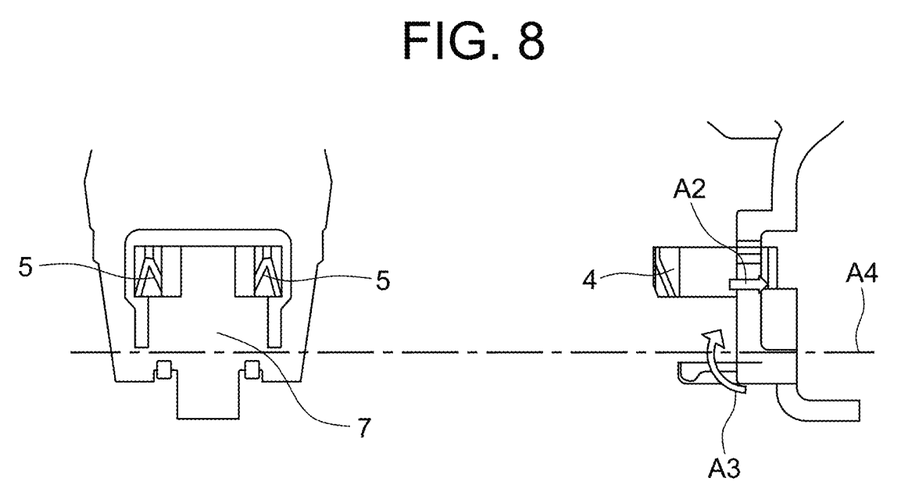
FIG. 8 is an enlarged partial version of FIGS. 4A and 4B showing a pivot of a support base.

In the door handle configured as described above, first, the insertion projecting piece 17a of the back cover 2 is fitted into the recess 1c of the front cover 1, and then the insertion projecting piece 17a is rotated about a fitting portion as a rotation center so that front end portions of the insertion projecting piece 17a and the fitting portion are overlapped with each other. Referring now to FIGS. 7-9, when the support base 7, which is exposed to the back surface side and can be pressed in the direction of arrows A2 in a state where the front and back covers 1 and 2 are overlapped with each other, is pushed into a front cover 1 side, with elastic deformation of the support base 7 in the direction of arrow A3 about a pivot denoted by dashed line A4, the locking hook 4 of the locking body 5 once comes into contact with the locked portion 6 of the front cover 1, and then the leg portion 3 is elastically deformed inward and the locking hook 4 climbs over the locked portion 6, and then the leg portion 3 returns to an original position and the locking hook 4 is elastically locked to the locked portion 6.

In a locked state, the support base 7 returns to an original position by an elastic restoring force. Since the support base 7 in a state before deformation is set such that the locking hook 4 is positioned slightly on the back surface side relative to the locked portion 6, when the support base 7 is returned to the original position in a state where the locking hook 4 is locked to the locked portion 6, the locking hook 4 is pulled to the back surface side, a contact pressure between the locking hook 4 and the locked portion 6 increases, and rattling in an overlapping direction is completely prevented.

As shown in FIGS. 2A and 6, when the front and back covers 1, 2 are connected, the press-contact projection 15a of the back cover 2 is press-contacted against the inclined surface 14 of the front cover 1 and the elastic piece 15 is elastically deformed, and a force represented by arrow A1 in a direction substantially orthogonal to the inclined surface 14 is generated by a restoring force thereof.

A component force in a back surface direction of a force received from the inclined surface 14 presses the back cover 2 in the back surface direction. As a result, the contact pressure between the locking hook 4 and the locked portion 6 is increased, which is useful for preventing the rattling in a front-back direction.

On the other hand, the back cover 2 is press-contacted rearward by the component force in the longitudinal direction of the door handle of the force received from the inclined surface 14. As a result, slide stoppers 16 of the front and back covers 1 and 2 come into press-contact with each other, thereby preventing the rattling in the longitudinal direction of the door handle.

According to the embodiment, a vehicle door handle includes a pair of the front and back covers 1, 2 which are connected to each other. One of the front and back covers 1, 2 includes the locking body 5 in which the locking hook 4 projects from the tip end of the leg portion 3 configured to elastically deform, only by overlapping the front and back covers 1, 2, the locking hook 4 of the locking body 5 interferes with the locked portion 6 of the other of the front and back covers 1, 2, the leg portion 3 is elastically deformed once, and then returns to an original position by an elastic restoring force, the locking hook 4 is locked to the locked portion 6, and a connected state of the front and back covers 1, 2 is held.

In order to lock the locking hook 4 formed at the tip end of the leg portion 3 to the locked portion 6, as described above, it is necessary to retract the locking hook 4 once to a non-interfering position of the locked portion 6 and then move the locking hook 4 to a locking position. In order to secure a movement path of the locking hook 4, a gap is generated between locking surfaces of the locking hook 4 and the locked portion 6 in the locked state, and this gap causes rattling. Further, if the gap is made small in order to prevent the rattling, a locking failure occurs when manufacturing tolerances are accumulated in a negative direction.

In the embodiment, a biasing force in a locking direction is applied to the locking body 5 in the connected state, even when the gap is formed, the locking body 5 is biased in the locking direction after the gap is formed, so that the gap is absorbed and the locking is brought into a press-contact state. As a result, since the connection is completed only by an operation of locking the locking body 5, it is possible to improve work efficiency, to reliably prevent the occurrence of the rattling, and to improve reliability of a connection operation.

An application of a press-contact force to the locking body 5 can be implemented by, for example, in a cover on which the locking body 5 is formed, setting a member that elastically deforms and presses against a cover on an opposite side at a completion of the connection operation, but when the locking body 5 is erected on the support base 7 which is configured to elastically deform in a press-contact direction of the locking hook 4, the structure is simplified.

The back cover 2 of the front and back covers 1, 2 may include the support base 7. The support base 7 may have a pressing portion 8 which is pressed toward a front cover 1 side when the front and back covers are connected. It is possible to reliably prevent the support base 7 from being elastically deformed due to contact of the locking hook 4 with the locked portion 6 when the front and back covers 1 and 2 are overlapped and the locking from becoming incomplete.

An electrical component 9 may be fixed to the one or the other of the front and back covers 1, 2. The other of the front and back covers 1, 2 may include a harness holding portion 11 holding a harness 10 of the electrical component 9. The harness holding portion 11 may include stopper projections 13 projecting from tip ends of a pair of rising pieces 12 disposed along a width direction of the front and back covers 1, 2 in a facing direction. The harness holding portion 11 and the locked portion 6 may be disposed along the width direction. Since the harness 10 can be prevented from being caught when the front and back covers 1 and 2 are overlapped, the work efficiency is improved.

That is, when the harness 10 connected to the electrical component 9 mounted on the door handle is inserted between the rising pieces 12 forming the harness holding portion 11, thereafter, since coming-off of the harness 10 is restricted by the stopper projection formed at the tip ends of the rising pieces 12, it is possible to stabilize a path of the harness 10, and prevent the harness 10 from being unprepared caught when the front and back covers 1, 2 are overlapped.

Generally, in the front and back covers 1, 2, a parting surface of a molding die is disposed at appropriate positions in an overlapping direction, that is, in a front-back direction, so that the stopper projection required to prevent the harness 10 from popping out of the harness holding portion 11 is an undercut portion with respect to an one-sided split surface. In order to form the undercut portion, it is necessary to use a slide mold or the like that slides parallel to the one-sided split surface.

On the other hand, although the locked portion 6 also similarly forms the undercut portion with respect to the one-sided split surface, similarly, it is necessary to use a slide mold or the like, but by disposing the harness holding portion 11 and the locked portion 6 side by side in the width direction, the undercut portion can be processed by the same slide mold, so that a structure of a die can be simplified.

The one of the front and back covers may include an elastic piece 15 in a vicinity of an end part of the one or the other of the front and back covers 1, 2, and in a vicinity of the support base 7. A free end of the elastic piece 15 may be press-contacted to an inclined surface 14 formed on the other of the front and back covers 1, 2, when the front and back covers are connected. The front and back covers may be biased in a longitudinal direction by an elastic restoring force of the elastic piece 15, slide stoppers 16 formed on the front and back covers 1, 2 may be pressed-contacted to each other, a biasing force in a detachment direction is applied to the front and back covers, and a contact pressure between the locking hook 4 and the locked portion 6 may be increased. Since it is possible to reliably prevent the rattling in the longitudinal direction of the cover, a component force in the front-back direction that the elastic piece 15 receives from the inclined surface can act with the biasing force with which the locking hook 4 is press-contacted against the locked portion 6 in the locked state with the locked portion 6, it is possible to completely prevent the rattling in the front-back direction.

What is claimed is:

1. A vehicle door handle comprising:
a front cover and a back cover which are connected to each other,
wherein one of the front and back covers includes a locking body,
wherein the locking body includes a leg portion configured to elastically deform and a locking hook projecting from a tip end of the leg portion,
wherein the locking hook is elastically locked and connected to a locked portion formed on the other of the front and back covers,
wherein the locking body is biased and the locking hook is press-contacted to the locked portion in a locking state of the locking body and the locked portion,
wherein the one of the front and back covers which includes the locking body comprises an elastic piece in a vicinity of an end part of the one or the other of the front and back covers, the elastic piece being separate from both the locking body and the locking hook,
wherein a free end of the elastic piece is press-contacted to an inclined surface formed on the other of the front and back covers which includes the locking hook when the front and back covers are connected, the inclined surface being separate from both the locking body and the locking hook,
wherein the inclined surface is inclined relative to the free end of the elastic piece such that the front and back covers are biased relative to each other in a longitudinal direction by an elastic restoring force of the elastic piece to cause slide stoppers formed on the front and back covers to be press-contacted to each other, and
wherein a biasing force in a detachment direction is applied to the front and back covers by the restoring force of the elastic piece such that a contact pressure between the locking hook and the locked portion is increased.

2. The vehicle door handle according to claim 1,
wherein the locking body is erected on a support base which configured to elastically deform in a press-contact direction of the locking hook.

3. The vehicle door handle according to claim 2,
wherein the back cover includes the support base, and
wherein the support base has a pressing portion which is pressed toward a front cover side when the front and back covers are connected.

4. The vehicle door handle according to claim 1,
wherein an electrical component is fixed to the one or the other of the front and back covers,
wherein the other of the front and back covers includes a harness holding portion holding a harness of the electrical component,
wherein the harness holding portion includes a pair of rising pieces disposed along a width direction of the front and back covers, and stopper projections projecting from tip ends of the pair of rising pieces in a facing direction, and wherein the harness holding portion and the locked portion are aligned with each other along the width direction.

5. A vehicle door handle comprising:

a front cover and a back cover which are connected to each other, wherein the back cover includes a locking body, wherein the locking body includes a leg portion configured to elastically deform and a locking hook projecting from a tip end of the leg portion, wherein the locking hook is elastically locked and connected to a locked portion formed on the front cover, wherein the locking body is biased and the locking hook is press-contacted to the locked portion in a locking state of the locking body and the locked portion, wherein the back cover includes a substantially planar support base on which the locking body is erected, an entirety of the support base extending in a direction substantially perpendicular to the locking body, the support base having a cantilever shape with one edge attached to the back cover as a fixed end, the support base configured to elastically deform toward a front cover side in a press-contact direction of the locking hook when the front and back covers are overlapped with each other, wherein the support base has a pressing portion which is pressed toward the front cover side when the front and back covers are overlapped with each other to place the locking hook and the locked portion in the locking state and to connect the front and back covers, wherein prior to deformation of the support base and prior to the locking hook being locked to the locked portion, the support base is positioned such that the locking hook is closer to a back surface side of the back cover than the locked portion, and wherein when the support base is returned to an original position after the deformation of the support base and the pressing portion being pressed toward the front cover side such that the locking hook and the locked portion are in the locking state, the support base is positioned such that the locking hook is pulled toward the back surface side and pressed into contact with the locked portion.

6. A vehicle door handle comprising:

a front cover and a back cover which are connected to each other, wherein the back cover includes a locking body, wherein the locking body includes a leg portion configured to elastically deform and a locking hook projecting from a tip end of the leg portion, wherein the locking hook is elastically locked and connected to a locked portion formed on the front cover, wherein the locking body is biased and the locking hook is press-contacted to the locked portion in a locking state of the locking body and the locked portion, wherein the back cover includes a support base on which the locking body is erected, an entirety of the support base extending in a direction substantially perpendicular to the locking body, the support base having a cantilever shape with one edge as a fixed end, the support base configured to elastically deform in a press-contact direction of the locking hook when the front and back covers are overlapped with each other, wherein prior to deformation of the support base and prior to the locking hook being locked to the locked portion, the support base is positioned such that the locking hook is closer to a back surface side of the back cover than the locked portion, and when the support base is returned to an original position after deformation when the locking hook and the locked portion are in the locking state, the locking hook is pulled toward the back surface side, wherein the locking body includes a pair of the leg portions, wherein the front cover includes a harness holding portion holding a harness of an electrical component, wherein the harness holding portion extends from a front end portion of the front cover in a space within the leg portions and includes a pair of rising pieces disposed along a width direction of the front and back covers, and stopper projections projecting from tip ends of the pair of rising pieces in a facing direction, and wherein the harness holding portion and the locked portion are aligned with each other along the width direction.

* * * * *